US005460358A

United States Patent [19]

Sendoykas

[11] Patent Number: 5,460,358

[45] Date of Patent: Oct. 24, 1995

[54] POWER CLAMP

[76] Inventor: Jack J. Sendoykas, 23510 Denton, Apt. 227T, Clinton Township, Mich. 48036

[21] Appl. No.: 158,391

[22] Filed: Nov. 29, 1993

[51] Int. Cl.[6] ........ B23Q 3/08

[52] U.S. Cl. ........ 269/32

[58] Field of Search ........ 269/32, 91–94, 269/228, 233, 232, 229

[56] References Cited

U.S. PATENT DOCUMENTS

| | | | |
|---|---|---|---|
| 2,162,133 | 6/1939 | Spire | 269/32 |
| 3,570,835 | 3/1971 | McPherson | 269/32 |
| 3,576,151 | 4/1971 | Sendoykas . | |
| 4,887,803 | 12/1989 | Witt | 269/32 |
| 5,020,418 | 6/1991 | Sendoykas . | |
| 5,216,942 | 6/1993 | Sendoykas . | |

*Primary Examiner*—Robert C. Watson
*Attorney, Agent, or Firm*—Young, MacFarlane & Wood

[57] ABSTRACT

A power clamp including a clamp assembly which is moved by a power cylinder rapidly to an approximate clamping position and is thereafter moved by the power cylinder with an intensified force to the final clamp position. The clamp includes a support structure defining a guideway, a drive assembly secured to the piston rod of the power cylinder and slidably mounted in the guideway, a guide lever pivotally mounted to the support structure, and a clamp lever pivotally mounted to the guide lever. The drive assembly includes a drive pin which is received in guide slots in the guide lever and in the clamp lever. The initial movement of the clamp assembly comprises joint pivotal movement of the guide lever and clamp lever about the pivot axis of the guide lever, the next portion of the movement comprises pivotal movement of the clamp lever relative to the guide lever under the impetus of the drive pin, and the final portion of the clamping movement comprises intensified incremental pivotal movement of the clamp lever relative to the guide lever resulting from wedging engagement of a roller carried by the drive assembly against a wedge surface defined by a tail portion of the clamp lever.

16 Claims, 6 Drawing Sheets

POWER CLAMP

BACKGROUND OF THE INVENTION

This invention relates to clamping mechanisms and more particularly to a power clamping mechanism in which the clamping action is generated by an associated power cylinder.

Power clamps are in wide use in situations where it is desired to clamp an object between the clamp lever and a further surface to facilitate the performance of a work operation on the object. Whereas many prior art power clamp designs have been proposed and commercialized, all of the prior art designs suffer from one or more disadvantages. Specifically, they are overly complex in their structure and operation and/or require relatively large power cylinders to generate a given required amount of clamping force.

SUMMARY OF THE INVENTION

This invention is directed to the provision of an improved power clamp.

More specifically, this invention is directed to the provision of an improved power clamp embodying a simple construction and operation and providing a relatively large clamping force as compared to the size of the associated power cylinder.

The power clamp of the invention includes a support structure, a power cylinder mounted at the rear end of the support structure and including a piston rod, a clamp member positioned at the forward end of the support structure, and drive means interconnecting the clamp member and the piston rod and operative in response to forward stroking movement of the piston rod to move the clamp member between a retracted position and a clamping position.

According to the invention, the drive means is operative in response to forward movement of the piston rod through an initial portion of its forward stroke to move the clamping member from its retracted position to a preparatory position by a relatively large increment of movement for each increment of movement of the piston rod, and the drive means is operative in response to movement of the piston rod through a terminal portion of its forward stroke to move the clamping member from its preparatory position to its clamping position by a relatively small increment of movement for each increment of movement of the piston rod. This arrangement allows the clamping force to be intensified during the terminal portion of the forward stroking movement of the piston rod so as to provide a relatively large clamping force as compared to the size of the associated power cylinder.

According to a further feature of the invention, the clamp member comprises a clamp lever including a guide slot and a wedge surface; the drive means includes a drive pin coupled to the piston rod and slidably received in the guide slot and a wedge member coupled to the piston rod; the movement of the clamp lever from its retracted position to its preparatory position is generated by coaction of the pin and the guide slot; and the movement of the clamp lever from its preparatory position to its clamping position is generated by coaction of the wedge surface with the wedge member. This specific arrangement provides a simple and effective means of generating the intensified clamping force during the terminal portion of the stroking movement of the piston rod.

According to a further feature of the invention, the drive means further includes a guide lever pivotally mounted on the support structure proximate the forward end of the support structure and including a guide slot slidably receiving the drive pin, and the clamp lever is pivotally mounted to the guide lever at a fulcrum. This specific clamp lever and guide lever arrangement facilitates the desired initial and terminal movement of the clamp lever so as to quickly bring the clamp lever into a preparatory position and thereafter generate an intensified clamping force to facilitate the final clamping action.

According to a further feature of the invention, the clamp lever defines a clamp finger at one side of the fulcrum and the wedge surface is defined on the other side of the fulcrum. This specific lever construction facilitates the desired final intensifier clamping action.

According to a further feature of the invention, the clamp lever has an L-configuration; the clamp finger constitutes one leg of the L-configuration; the guide slot is defined in the other leg of the L-configuration; and the wedge surface is defined on the remote end of the other leg outboard of the guide slot. This specific configuration of the clamp lever further facilitates the pivoting and clamping action of the clamp lever.

According to a further feature of the invention, the support member defines a linear guideway generally aligned with the longitudinal axis of the piston rod; the drive means includes an elongated member mounted for sliding movement in the guideway; the drive pin is mounted on the forward end of the elongated member; and the wedge member comprises a roller mounted on the elongated member rearwardly of the drive pin and adapted to rollably engage the wedge surface. This specific drive assembly construction facilitates the firm, positive, and efficient movement of the clamp lever from its initial to its preparatory position and thereafter to its final intensified clamping position.

In the disclosed embodiment of the invention, the guideway includes a pair of confronting laterally spaced longitudinally extending grooves in the support member; the elongated drive member includes a pair of drive bars each slidably received in a respective groove; the drive pin and the roller are mounted between the drive bars; and the drive means further includes a nut mounted on the rear ends of the drive bars and threaded on the forward end of the piston rod.

DETAILED DESCRIPTION OF THE PREFERRED EMBODIMENTS

Figure 19:
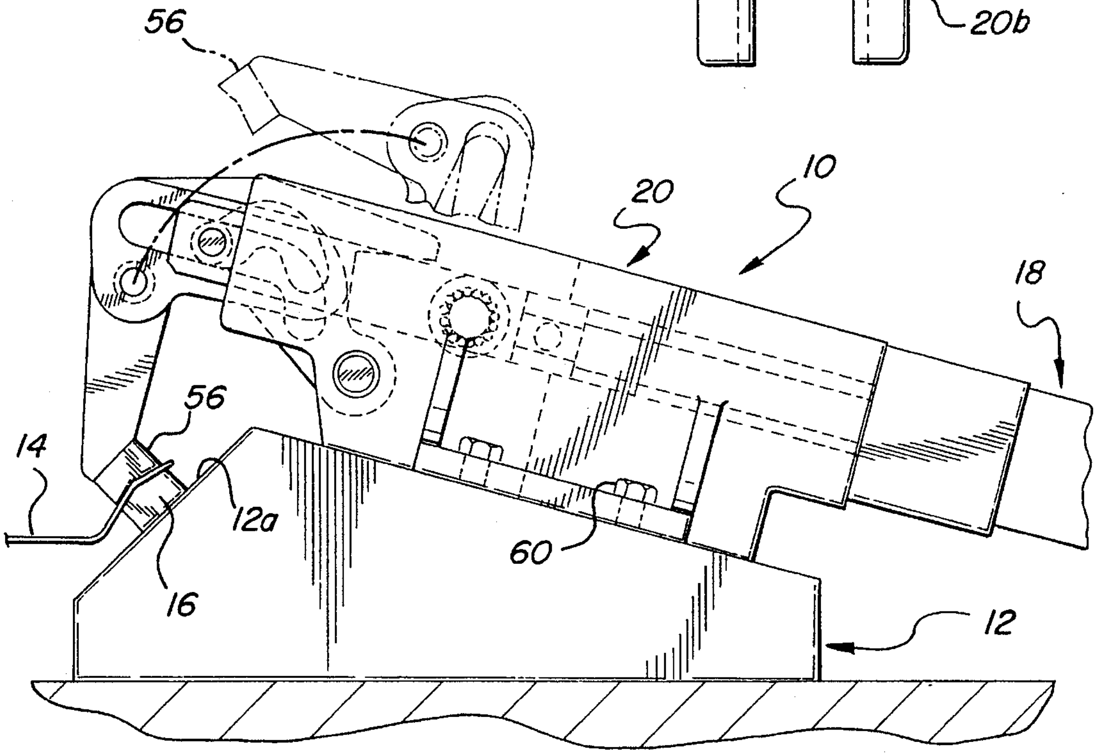
FIG. 19 is a somewhat schematic view showing the power clamp in association with a fixture base.

The power clamp 10 of the invention, as best seen in FIG. 19, is adapted to be fixedly secured to a suitable fixture base 12 and is operative to clamp a part 14 to a clamp block 16 secured to an angled side face 12*a* of the base to clamp the part to the base to facilitate the performance of a work operation on the part.

The invention power clamp 10 includes a power cylinder 18, a support structure 20, a drive assembly 22, and a clamp assembly 24.

Figure 17:
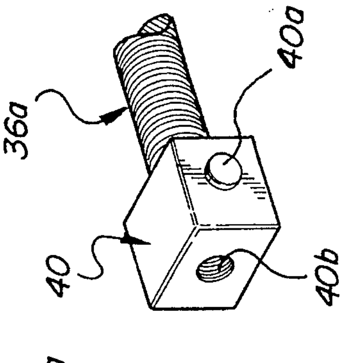
FIG. 17 is a perspective view of a nut forming a part of the drive assembly.

Power cylinder 18 includes end blocks 26 and 28, a cylinder 30, tie rods 32 extending between the end blocks and clamping the cylinder 30 therebetween, a piston 34 (FIG. 2) mounted for reciprocal sliding movement in the cylinder, and a piston rod 36 secured to the piston and projecting at its forward end 36*a* (FIG. 17) out of the cylinder.

Cylinder 18 is of standard construction and may, for example, comprise a hydraulic power cylinder available from Parker Hannifin Corporation, Cylinder Division, of Des Plains, Ill. as Series 3L, Medium Duty Hydraulic Cylinder.

Support structure 20 is formed as a ferrous casting and includes a main body portion 20*a*, a bifurcated forward portion defined by a pair of spaced forward arm portions 20*b*, a pair of flange portions 20*c* to facilitate attachment of the support structure to fixture base 12, a pair of laterally spaced guideways 20*d* extending the full length of the support structure, a slot 20*e* extending from the rear face 20*f* of the support structure to the forward face 20*g* of the main body portion 20*a* of the support structure, a guide groove 20*h* underlying slot 20*e* and coextensive with slot 20*e*, and a transverse bore 20*i* adapted to receive a pivot pin.

Figure 1:
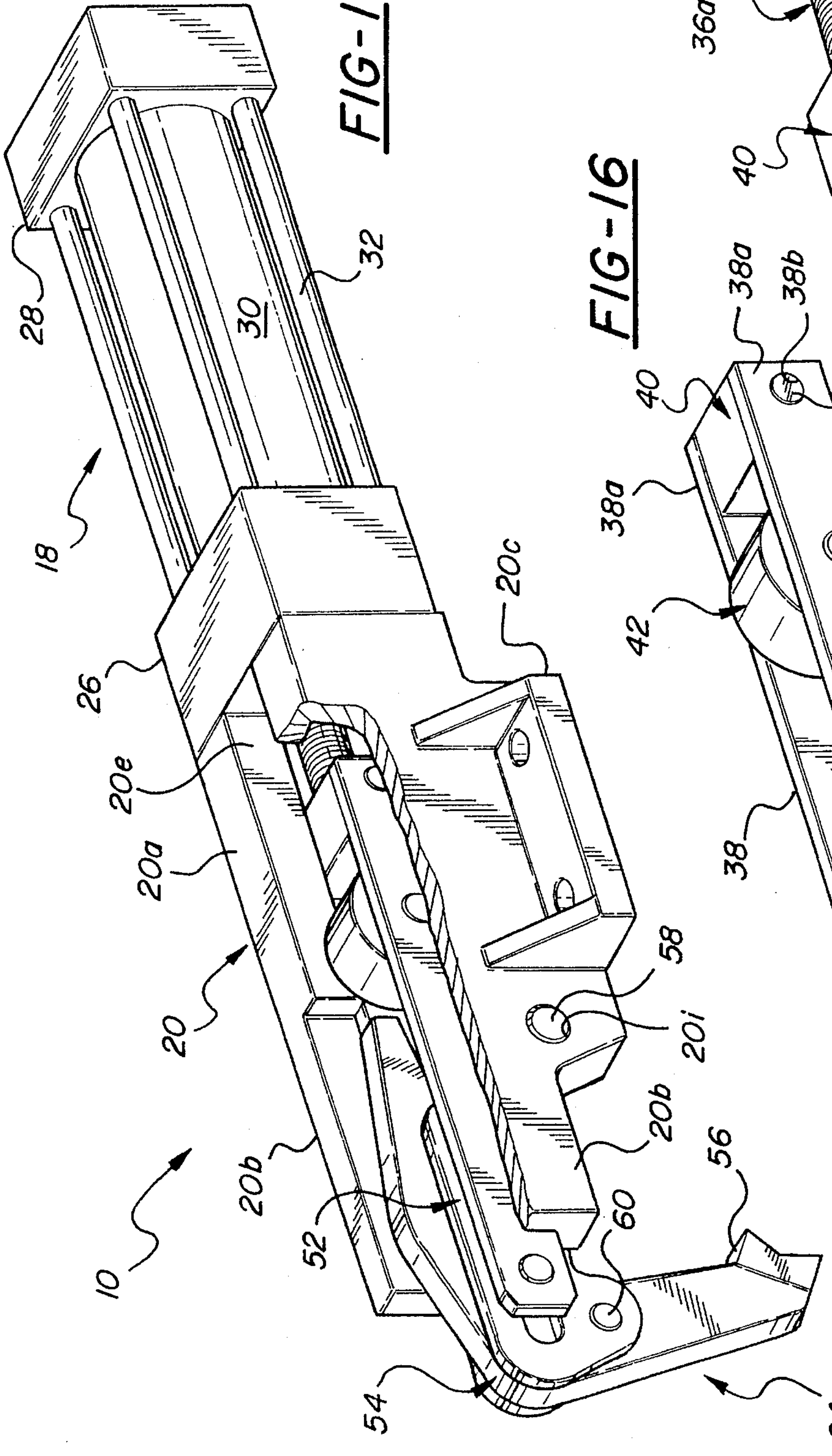
FIG. 1 is a perspective view of the invention power clamp.
Figure 16:
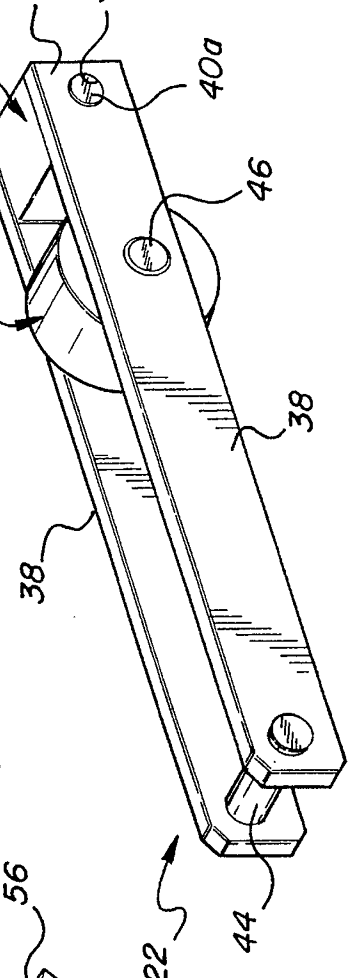
FIG. 16 is a perspective view of a drive assembly utilized in the power clamp.

Drive assembly 22 (FIG. 16) includes a pair of elongated driver bars 38, a nut 40, a roller assembly 42, and a drive pin 44. Driver bars 38 are sized to fit slidably in guideways 20*d*.

Nut 40 has a rectangular configuration and is sized to fit between the rear ends 38*a* of driver bars 38 with trunion portions 40*a* of the nut swivelly received in bores 38*b* in the driver bars.

Figure 8:
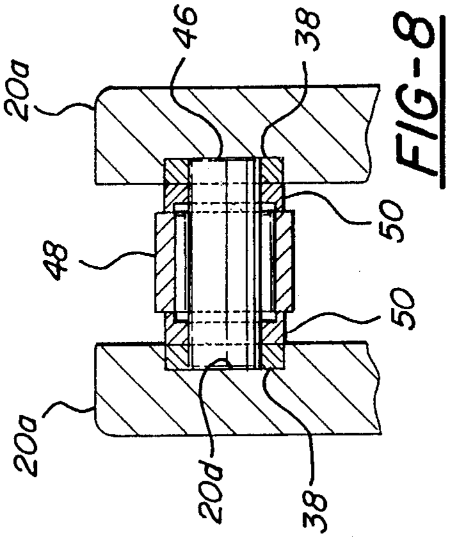

Roller assembly 42 includes a shaft 46 secured to driver bars 38 forwardly of nut 40, a roller bearing 48 journaled on shaft 46, and spacers 50 (FIG. 8) positioned on shaft 46 between roller bearing 48 and the inboard faces of driver bars 38.

Clamp assembly 24 includes a pair of guide levers 52, a clamp lever 54, a clamp block 56, a guide lever pivot pin 58, and a clamp lever pivot pin 60.

Figure 14:
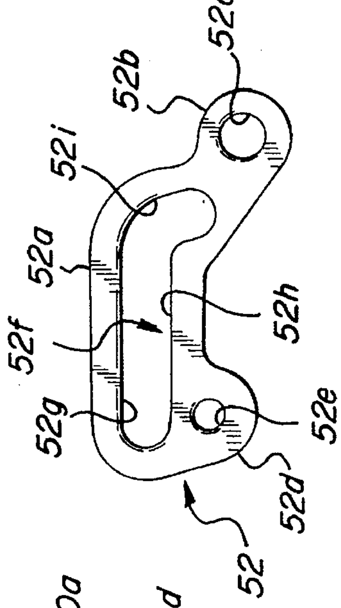
FIG. 14 is a detail view of a guide lever utilized in the power clamp.
Figure 13:
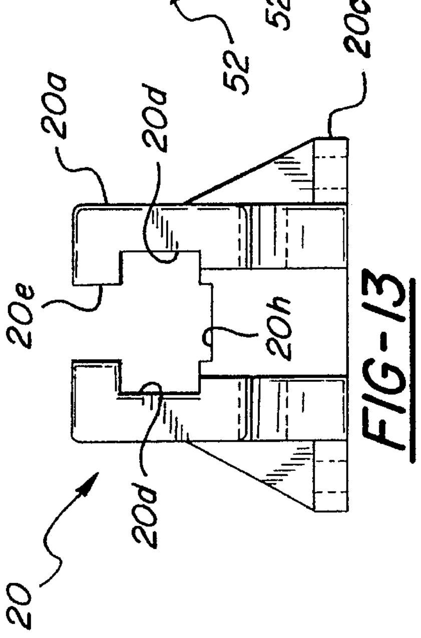
FIG. 13 is a front end view of the support structure.

Each guide lever 52 (FIG. 14) includes a main body portion 52*a*, a rear or tail portion 52*b* defining a pivot pin bore 52*c*, a forward nose portion 52*d* defining a pivot pin bore 52*e*, and a guide slot 52*f* defined in the main body portion 52*a* of the lever.

Guide slot 52*f* includes a linear forward portion 52*g*, a linear intermediate portion 52*h* in alignment with linear forward portion 52*g*, and a curvilinear rearward portion 52*i* extending downwardly from intermediate slot portion 52*h* toward lever tail portion 52*b*.

Figure 15:
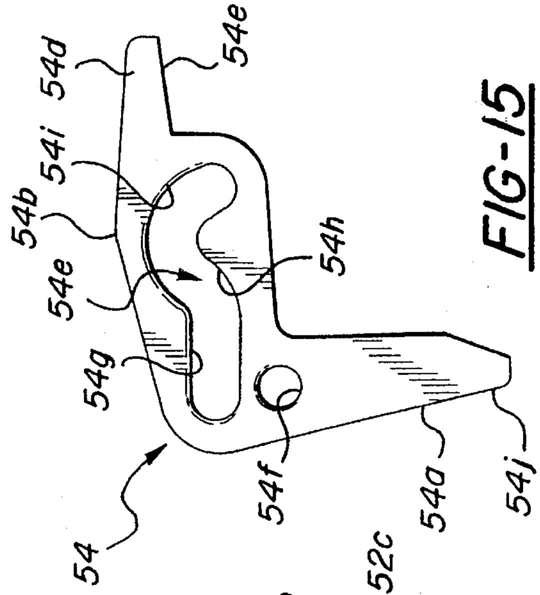
FIG. 15 is a detail view of a clamp lever utilized in the power clamp.

Clamp lever 54 (FIG. 15) has a thickness exceeding the thickness of guide levers 52 and has an L-shaped configuration. Clamp lever 54 includes a clamping finger 54*a* comprising one leg of the L-configuration, a main body portion 54*b* comprising the other leg of the L-configuration, a guide slot 54*c* defined in the main body portion, a tail portion 54*d* defined on the remote end of main body portion 54*b* and defining an intensifier wedge surface 54*e*, and a pivot pin bore 54*f* proximate the juncture of clamp finger portion 54*a* and main body portion 54*b*.

Guide slot 54*c* includes a linear forward portion 54*g*, a curvilinear intermediate portion 54*h*, and a reverse curvilinear rearward portion 54*i*.

Clamp block 56 is suitably secured to the free end 54*j* of clamp finger 54*a*.

Guide lever pivot pin 58 is journalled in pivot bores 20*i* of the support structure and passes through bores 52*c* of the guide levers. Clamp lever pivot pin 60 is mounted at its opposite ends in bores 52*e* of guide levers 52 and passes between its ends through bore 54*f* of clamp lever 54 so as to pivotally mount the clamp lever relative to the guide levers.

In the assembled relation of the parts, support structure 20 is clamped to fixture base 12 utilizing suitable fasteners 60; clamp assembly 24 is positioned between spaced support structure arm portions 20*b* with guide levers 52 pivotally mounted to the support structure by pivot pin 58 and with clamp lever 54 pivotally mounted to the guide levers by pivot pin 60; drive assembly 22 is slidably positioned in guideways 20*d* with a driver bar 38 slidably positioned in each guideway and with drive pin 44 passing through the guide slots 52*f* of the guide levers and the guide slot 54*c* of the clamp lever; and the forward end 36*a* of the piston rod is threadably received in a threaded bore 40*b* in nut 40.

Figure 2:
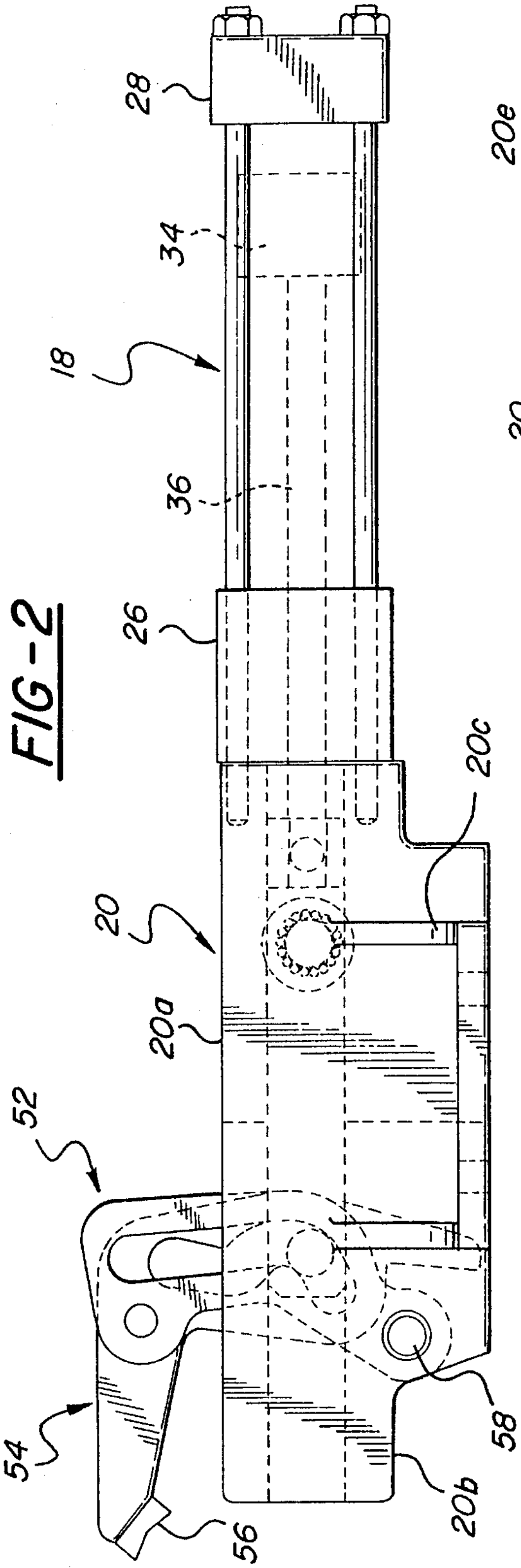
FIGS. 2, 3, and 4 are side elevational views of the invention power clamp illustrating the movement of the clamp lever of the power clamp from an initial position to a preparatory position.
Figure 12:
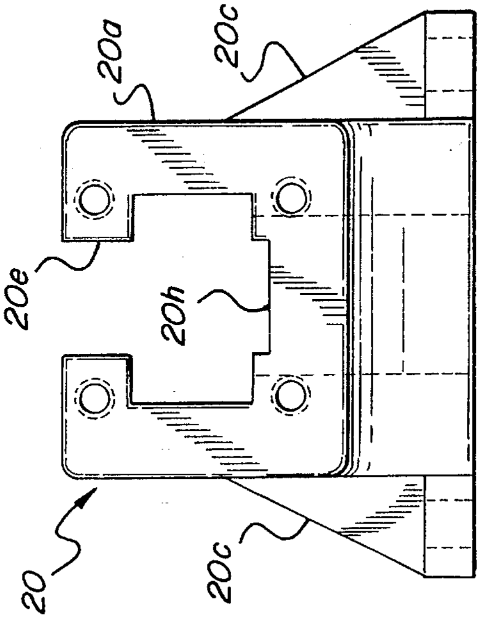
FIG. 12 is a rear end view of the support structure.
Figure 9:
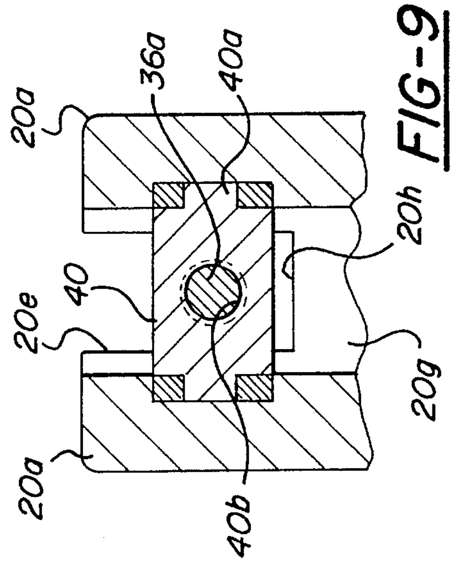
FIGS. 5, 6, 7, 8, and 9 are cross-sectional views taken respectively on lines 5—5, 6—6, 7—7, 8—8, and 9—9 of FIG. 4.
Figure 3:
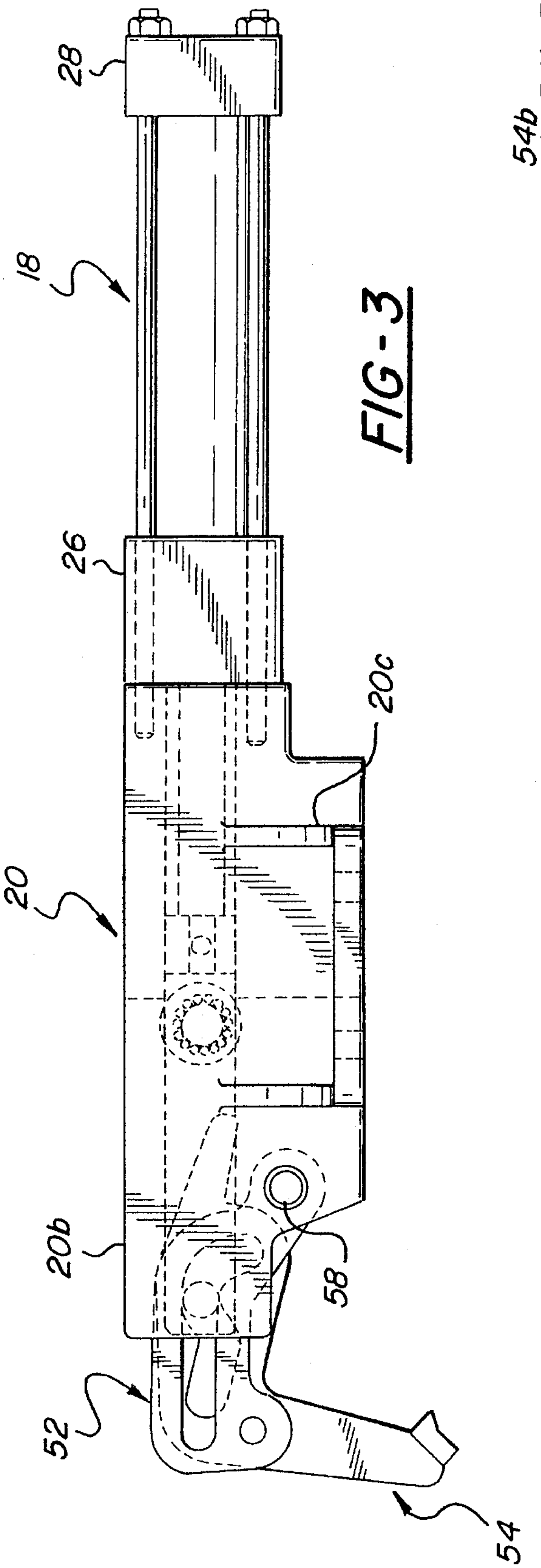
Figure 4:
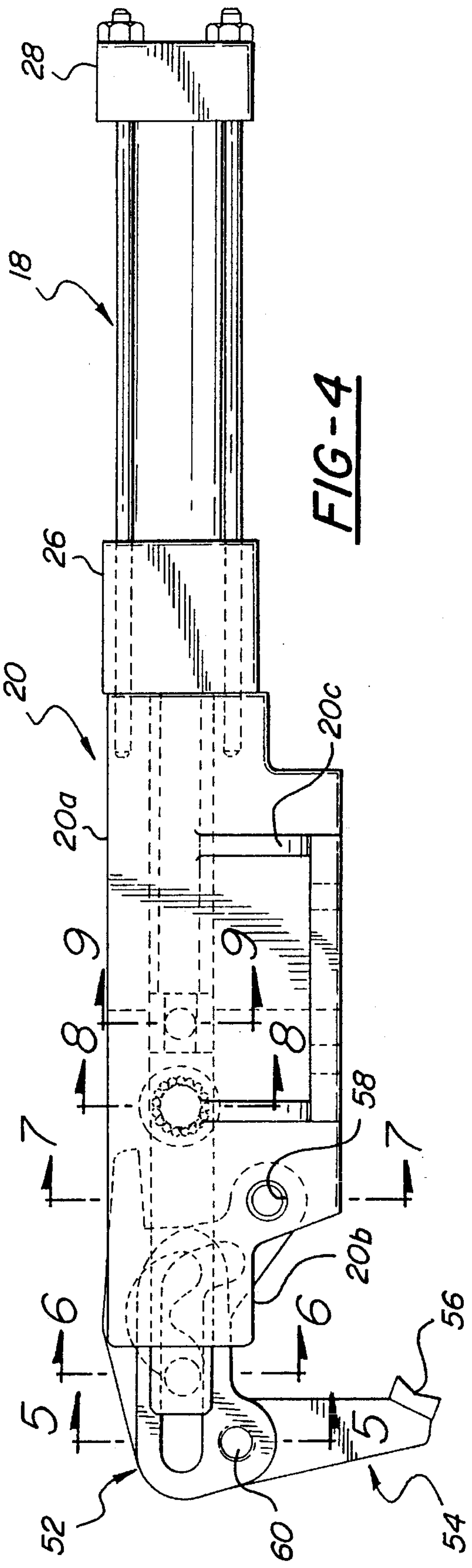
Figure 7:
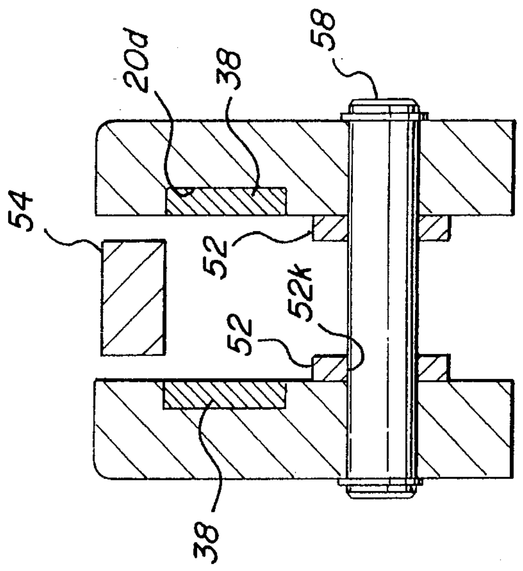
Figure 6:
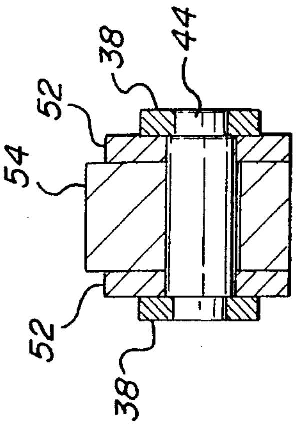
Figure 5:
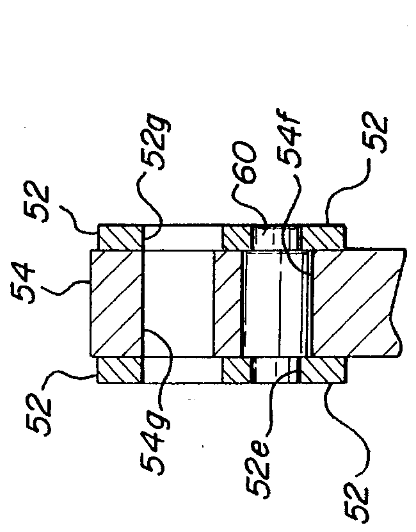
Figure 10:
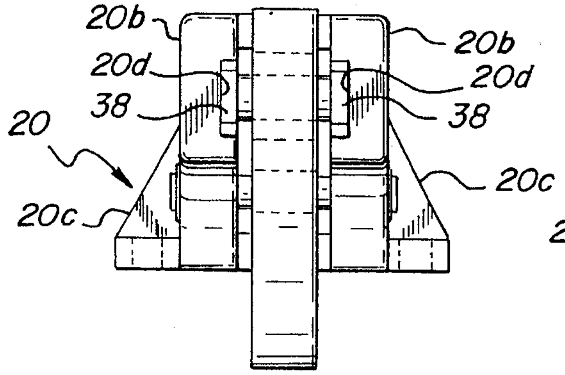
FIG. 10 is a front end view of the invention power clamp.
Figure 11:
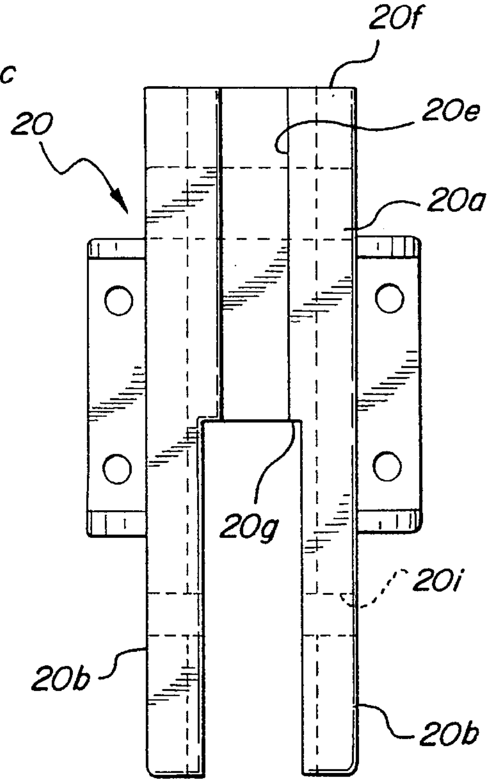
FIG. 11 is a plan view of a support structure utilized in the invention power clamp.
Figure 18:
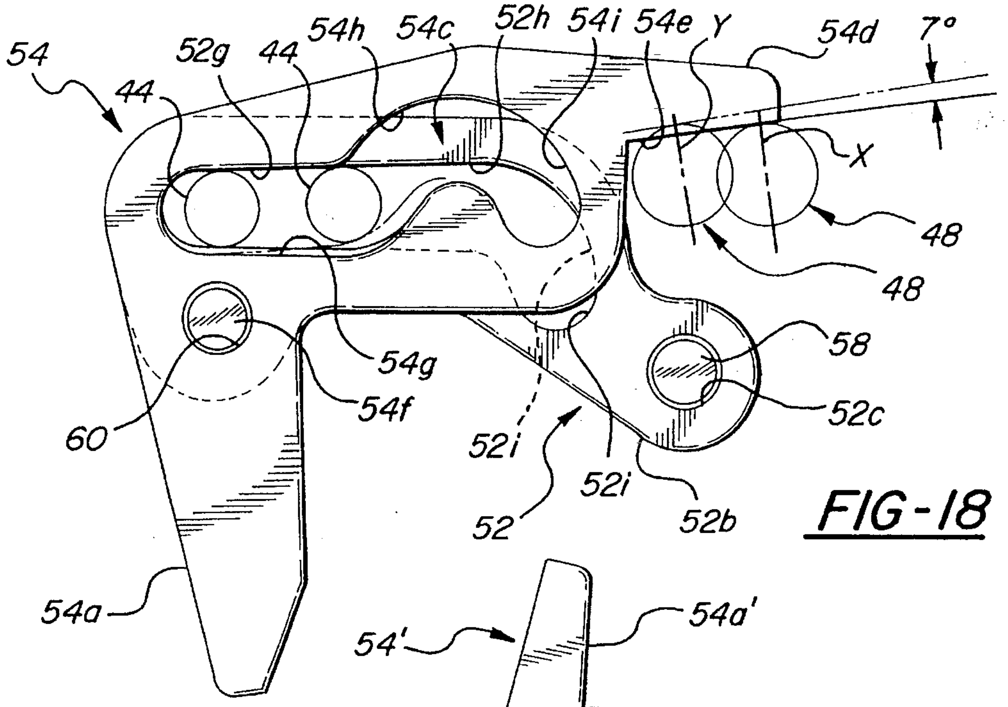
FIG. 18 is a somewhat schematic view showing the movement of the clamp lever from its preparatory position to its final clamping position.

In operation, the power clamp is moved in response to suitable actuation of the power cylinder 18 between a retracted position seen in FIG. 2, an intermediate position seen in FIG. 3, a preparatory position seen in FIG. 4, and a final clamped position seen in dash lines in FIG. 18.

In overview, the movement of the clamp assembly between the retracted position of FIG. 2 and the intermediate position of FIG. 3 comprises joint pivotal movement of the guide levers and the clamp lever about pivot pin 58 under the urging of drive pin 44; the movement of the clamp assembly between the intermediate position of FIG. 3 and the preparatory position of FIG. 4 comprises pivotal movement of the clamp lever relative to the guide levers about pivot pin 60 under the urging of drive pin 44; and the movement of the clamp assembly between the preparatory position of FIG. 4 and the final clamp position seen in dotted lines in FIG. 18 comprises further, intensified incremental pivotal movement of the clamp lever relative to the guide levers about the pivot pin 60 under the coaction of roller 48 and wedge surface 54*e*.

More specifically, the movement of the clamp assembly between the retracted position of FIG. 2 to the intermediate position of FIG. 3 is accomplished by forward stroking movement of the drive assembly 22 along the guideways

20*d* with the drive pin 44 moving from a position within the rearward curvilinear aligned guide slot portions 52*i* and 54*i* of the guide levers and clamp lever to a position at the forward end of the aligned rearward curvilinear guide slot portions and proximate the intermediate guide slot portions 52*h* and 54*h*; and the movement of the clamp assembly from the intermediate position of FIG. 3 to the preparatory position of Figure 4 is accomplished by further forward stroking movement of the drive assembly 22 with the drive pin 44 moving from a position at the rearward end of the intermediate guide slot portion 52*h* of the guide levers and the rear end of the curvilinear intermediate guide slot portions 54*h* of the clamp lever to a position at the forward ends of the intermediate slot portions.

The pivotal movement of the clamp lever relative to the guide levers as the clamp assembly moves between the intermediate position of FIG. 3 and the preparatory position of FIG. 4 occurs by virtue of the disparity between the curvilinear configuration of the intermediate slot portion 54*h* of the clamp lever and the linear configuration of the intermediate slot portion 52*h* of the guide levers.

The final intensifying movement of the clamp lever from the preparatory position of FIG. 4 to the final clamp position seen in dotted lines in FIG. 18 occurs in response to further forward stroking movement of driver assembly 22 with drive pin 44 moving forwardly within the aligned forward linear slot portions 52*g*, 54*g* of the guide levers and the clamp lever and roller 48 moving into engagement with wedge surface 54*e* on tail portion 54*d* of the clamp lever to pivot the clamp lever about the fulcrum defined by pivot pin 60 in a final intensified pivotal movement to firmly and positively clamp the part 14 between the clamp blocks 56 and 16.

The final intensifying movement of the clamp lever to its final clamping position is best seen in FIG. 18 wherein the roller 48 is seen to initially engage the wedge surface 54*e* on the tail portion of the clamp lever at a location X. Thereafter, with continued forward movement of the drive assembly 22 and rolling movement of the roller 48 along the surface 54*e*, the roller moves to a point Y on the surface 54*e* corresponding to the final clamping position of the clamp lever. During this final intensifying movement of the driver assembly, the drive pin 44 moves innocuously forwardly within the aligned forward guide slot portions 52*g* and 54*g*. The forward guide slot portion 54*g* of the clamp lever has a width slightly exceeding the diameter of drive pin 44, and slightly exceeding the width of guide lever forward slot portion 52*g*, so as to allow the drive lever to undergo a limited amount of pivotal movement about pivot pin 60 during the final intensifying pivotal movement of the clamp lever without interference to this final pivotal movement by the drive pin 44.

Whereas the particular magnitude of the final intensifying pivotal movement of the clamp lever in response to the rolling action of roller 48 will vary depending upon the particular clamping application, in one advantageous embodiment of the invention the various parts are sized so that the clamp lever moves through an angle of 7 degrees during the final intensifying movement, that is, between the point where the roller engages the wedge surface 52*e* at the point X and the point of engagement Y between the roller and the surface 54*e* at the termination of the forward stroking movement of the drive assembly.

It will be seen that the drive assembly is operative in response to forward movement of the piston rod through an initial portion of its forward stroke to move the clamping assembly from its retracted position to a preparatory position by a relatively large increment of movement for each increment of movement of the piston rod and that the drive assembly is operative in response to movement of the piston rod through a terminal portion of its forward stroke to move the clamp assembly from its preparatory position to its final clamp position by a relatively small increment of movement for each increment of movement of the piston rod. This arrangement allows the clamp assembly to be moved quickly to a gross or approximate preparatory clamping position and then moved slowly but with a greatly intensified force to the final clamping position. This arrangement allows a given size power cylinder operating under a given magnitude of hydraulic pressure to exert a much larger clamping force than would be possible without the use of the invention intensifier effect.

Figure 20:
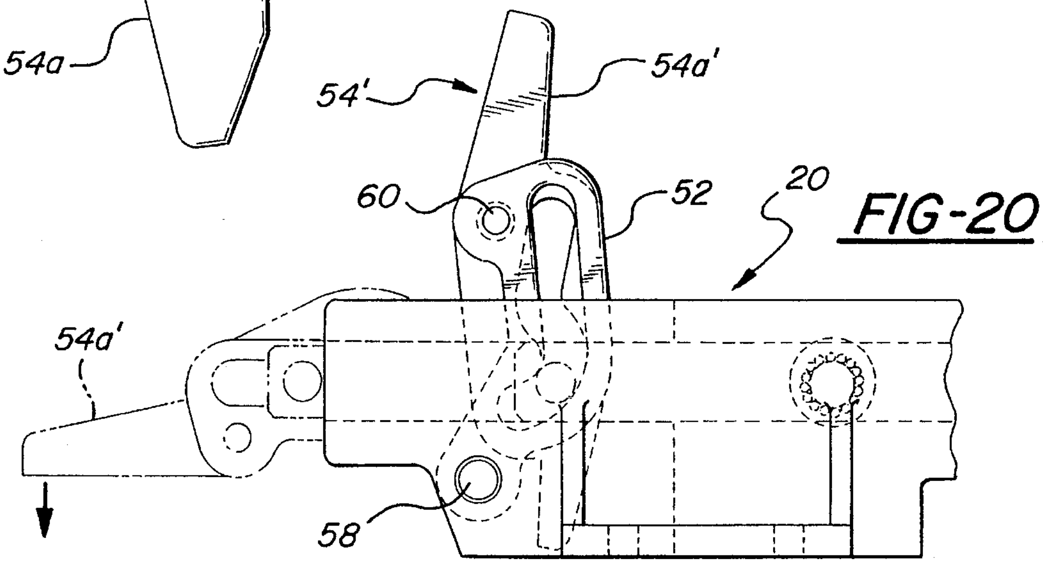
FIG. 20 is a somewhat diagrammatic view showing a modification of the invention clamp.
Figure 21:
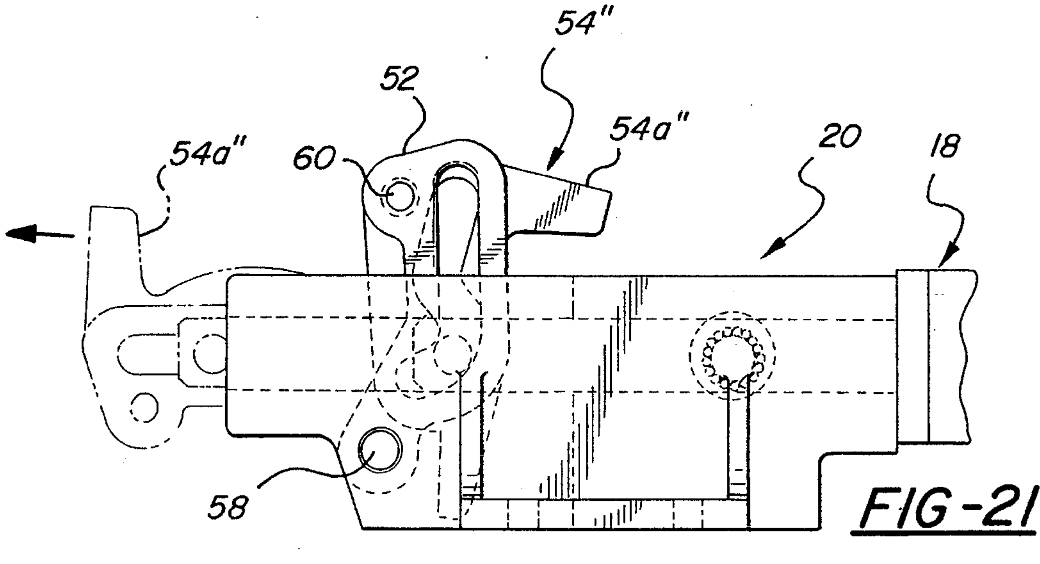
FIG. 21 is a somewhat diagrammatic view showing a further modification of the invention clamp.

The modified power clamp constructions seen in FIGS. 20 and 21 are identical to the power clamp construction of FIGS. 1–19 with the exception that the configuration of the clamp lever 54 has been modified to modify the final clamping position of the finger portion of the clamp lever so as to accommodate various clamping requirements.

Specifically, in the FIG. 20 embodiment, the clamp lever 54' has a generally linear configuration (as opposed to the L-shaped configuration of the FIGS. 1–19 embodiment) with the result that the finger portion 54*a'* of the clamp lever extends generally vertically upwardly in the retracted position of the clamp assembly and occupies a generally horizontal position in the final clamping position of the clamp assembly so as to accommodate clamping applications in which it is desired to exert a generally vertically downwardly clamping force.

In the embodiment of FIG. 21, the clamp lever 54" has a reverse L-configuration (as compared to the L-configuration of the FIGS. 1–19 embodiment) so that the finger portion 54*a"* assumes a generally horizontal and rearwardly extending position in the retracted position of the clamp assembly and assumes a generally vertical upwardly extending position in the final clamping position of the clamp assembly so as to accommodate clamping applications in which it is desired to exert a generally forward clamping action.

The power clamp assemblies of the invention will be seen to provide important advantages. Specifically, by providing an extreme intensifier effect at the terminal portion of the movement of the clamp assembly, the clamp assembly is able to move quickly to a gross or an approximate clamping position and thereafter move with a greatly intensified force effect to the final clamp position so as to enable a given size and capacity power cylinder to generate extremely high clamping forces as compared to the prior art devices.

Whereas preferred embodiments of the invention have been illustrated and described in detail, it will be apparent that various changes may be made in the disclosed embodiments without departing from the scope or spirit of the invention.

I claim:

1. A power clamp including a support structure, a power cylinder mounted at the rear end of the support structure and including a piston rod, a clamp member positioned at the forward end of the support structure, and drive means interconnecting the clamp member and the piston rod and operative in response to forward stroking movement of the piston rod to move the clamp member between a retracted position and a clamping position; characterized in that the drive means is operative in response to forward movement of the piston rod through an initial portion of its forward stroke to move the clamp member from its retracted position to a preparatory position by a relatively large increment of movement for each increment of movement of the piston rod and the drive means is operative in response to movement of the piston rod through a terminal portion of its forward stroke to move the clamp member from its preparatory position to its clamping position by a relatively small increment of movement for each increment of movement of the piston rod;

the clamp member comprises a clamp lever including a guide slot and a wedge surface;

the drive means includes a drive pin coupled to the piston rod and slidably received in the guide slot and a wedge member coupled to the piston rod;

the drive means further includes a guide lever pivotally mounted to the support structure proximate the forward end of the support structure and including a guide slot slidably receiving the drive pin; and the clamp lever is pivotally mounted to the guide lever at a fulcrum.

2. A power clamp according to claim 1 wherein:

the clamp lever defines a clamp finger at one side of the fulcrum; and the wedge surface is defined on the other side of the fulcrum.

3. A clamp member according to claim 2 wherein:

the clamp lever has an L configuration;

the clamp finger constitutes one leg of the L configuration;

the guide slot is defined in the other leg of the L configuration; and the wedge surface is defined on the remote end of the other leg outboard of the guide slot.

4. A power clamp according to claim 1 wherein:

the support member defines a linear guideway generally aligned with the longitudinal axis of the piston rod;

the drive means includes an elongated member mounted for sliding movement in the guideway;

the drive pin is mounted on the forward end of the elongated member; and the wedge member comprises a roller mounted on the elongated member rearwardly of the drive pin and adapted to rollably engage the wedge surface.

5. A power clamp according to claim 4 wherein the guideway includes a pair of confronting laterally spaced, longitudinally extending grooves in the support member;

the elongated drive member includes a pair of drive bars each slidably received in a respective groove;

the drive pin and the roller are mounted between the drive bars; and the drive means further includes a nut mounted on the rear end of the drive bars and threaded on the forward end of the piston rod.

6. A power clamp comprising:

a support structure defining a linear guideway;

a power cylinder secured to the support structure and including a piston rod having a longitudinal axis in general alignment with the guideway;

a guide lever pivotally mounted to the support structure at a pivot axis proximate the guideway and including a guide slot;

a clamp lever pivotally mounted to the guide lever at a fulcrum and including a guide slot and a clamp finger;

drive means, including a drive pin mounted for linear movement along the guideway and slidably received in the guide slots, operative in response to initial forward stroking movement of the piston rod to pivot the guide lever and the clamp lever from a retracted position in which the clamp finger is removed from a coacting clamp surface to a preparatory position in which the clamp finger is positioned in spaced confronting relation to the clamp surface so as to clamp an object therebetween and operative in response to further forward stroking movement of the piston rod to pivot the clamp lever relative to the guide lever about the fulcrum so as to intensify the clamping pressure exerted against the object.

7. A power clamp according to claim 6 wherein:

the clamp finger is defined on one end of the clamp lever on one side of the fulcrum; and the drive means further includes an intensifier member mounted for linear movement along the guideway with the drive pin and operative during such further stroking movement to engage an intensifier surface on the clamp lever proximate the other end of the clamp lever on the other side of the fulcrum.

8. A power clamp according to claim 7 wherein:

the intensifier member comprises a roller mounted for linear movement along the guideway; and the roller rolls along the intensifier surface during such further stroking movement of the piston rod.

9. A power clamp according to claim 8 wherein:

the clamp lever has an L-shaped configuration;

the clamp finger comprises one leg of the L configuration;

the clamp lever guide slot is defined in the other leg of the L configuration; and the intensifier surface is defined on a tail portion of the clamp lever defined on the remote end of the other leg.

10. A power clamp according to claim 6 wherein:

the drive means comprises a drive assembly;

the drive assembly includes an elongated drive member mounted for sliding movement in the guideway;

the drive pin is mounted on the forward end of the elongated drive member; and the drive means further includes a coupler member mounted on the rear end of the elongated drive member and secured to the forward end of the piston rod and an intensifier member mounted on the elongated drive member between the drive pin and the coupler member and coacting with an intensifier surface on the clamp lever to pivot the clamp lever relative to the guide lever in response to the further stroking movement of the piston rod.

11. A power cylinder according to claim 10 wherein:

the intensifier member comprises a roller mounted for linear movement along the guideway; and the roller rolls along the intensifier surface during the further stroking movement of the piston rod.

12. A power clamp according to claim 11 wherein:

the guideway includes a pair of confronting, laterally spaced, longitudinally extending grooves in the support structure;

the elongated drive member includes a pair of drive bars each slidably received in a respective groove; and the drive pin, roller, and coupler are mounted between the drive bars.

13. A power clamp according to claim 12 wherein:

the coupler comprises a nut threadably received on the forward end of the piston rod.

14. A power clamp according to claim 6 wherein:

the guide slots each include a curvilinear rearward portion to generate pivotal movement of the levers about the pivot axis in response to the initial forward stroking movement of the piston rod and a linear forward portion;

the linear forward slot portions are in alignment with each other and with the guideway at the conclusion of the initial forward stroking movement of the piston rod so that, during such further forward stroking movement of the piston rod, the drive pin moves slidably forwardly in the slots along the guideway without pivoting the levers about the pivot axis.

15. The power clamp according to claim 14 wherein:

the forward portion of said clamp lever guide slot has a width slightly greater than the diameter of the drive pin so as to allow a limited amount of pivotal movement of the clamp lever about the fulcrum in response to such further stroking movement of the piston rod.

16. The power clamp according to claim 15 wherein:

the clamp lever guide slot includes a curvilinear intermediate portion interconnecting the curvilinear rearward portion and the linear forward portion;

the guide lever guide slot includes a linear intermediate portion interconnecting the curvilinear rearward portion and the linear forward portion and aligned with the linear forward portion; and the clamp lever intermediate slot portion coacts with the guide lever intermediate slot portion and the drive pin to generate a limited amount of pivotal movement of the clamp lever relative to the guide lever about the fulcrum during the initial forward stroking movement of the piston rod.

* * * * *